G. DALÉN.
GAS DISTRIBUTING SYSTEM FOR RAILWAY CARRIAGES.
APPLICATION FILED FEB. 27, 1913.

1,195,132.

Patented Aug. 15, 1916.
2 SHEETS—SHEET 1.

WITNESSES:—
Charles B. Crompton
John A. Percival

G. DALÉN.
INVENTOR.
BY Croydon Marks
ATTORNEY.

G. DALÉN.
GAS DISTRIBUTING SYSTEM FOR RAILWAY CARRIAGES.
APPLICATION FILED FEB. 27, 1913.

1,195,132.

Patented Aug. 15, 1916.
2 SHEETS—SHEET 2.

UNITED STATES PATENT OFFICE.

GUSTAF DALÉN, OF STOCKHOLM, SWEDEN, ASSIGNOR TO SVENSKA AKTIEBOLAGET GASACCUMULATOR, OF STOCKHOLM, SWEDEN.

GAS-DISTRIBUTING SYSTEM FOR RAILWAY-CARRIAGES.

1,195,132.            Specification of Letters Patent.      Patented Aug. 15, 1916.

Application filed February 27, 1913. Serial No. 751,062.

*To all whom it may concern:*

Be it known that I, GUSTAF DALÉN, a subject of the King of Sweden, residing at Stockholm, Sweden, have invented certain new and useful Improvements in Gas-Distributing Systems for Railway-Carriages, of which the following is a specification.

This invention has for its object to provide an improved arrangement for lighting railway carriages by means of compressed acetylene or other gas rich in carbon.

The accompanying drawing illustrates a lighting arrangement according to the invention.

Figure 1:
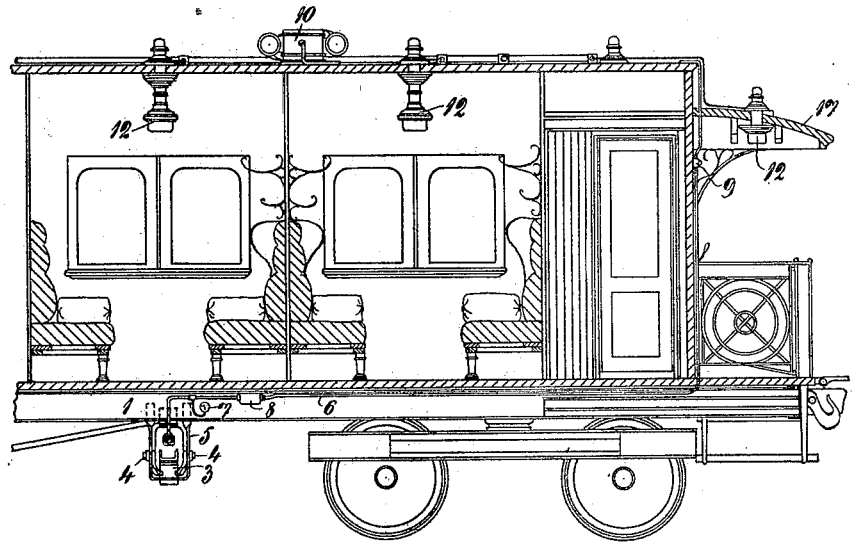
Figure 2:
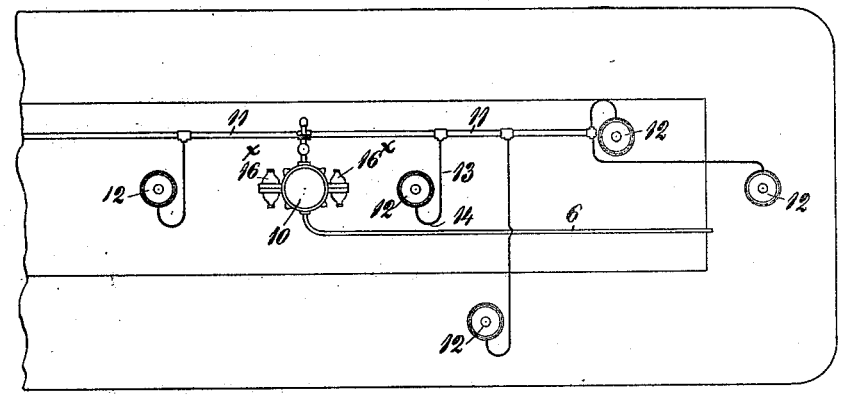
Figure 3:
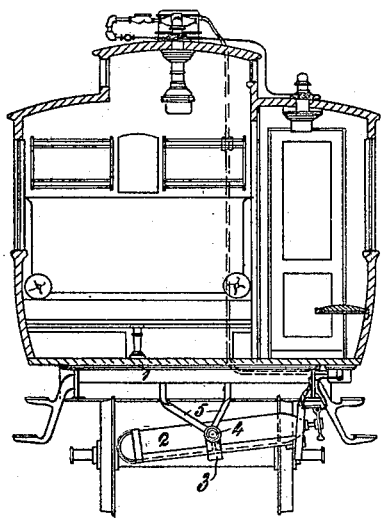
Figure 4:
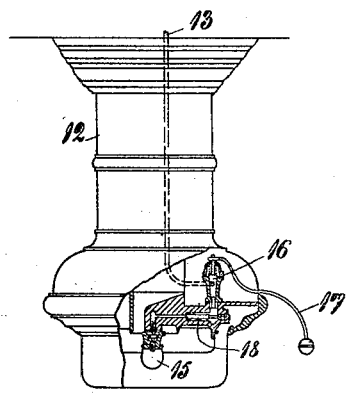

Figure 1 diagrammatically shows in longitudinal section a part of a railway carriage. Fig. 2 shows the same in plan. Fig. 3 is a cross section, and Fig. 4 is a view, partly in section of an incandescent lamp to a larger scale.

Below the under frame 1 of the carriage is a receiver 2 for compressed acetylene dissolved in acetone, or other gas rich in carbon. In an arrangement illustrated the receiver 2 is located transversely below the carriage and rests in a support 3 which is movable on trunnions 4 that are mounted in a bracket 5 fixed to the under frame of the carriage. A pipe 6 extends from the receiver 2 and is readily detachable from the same by means of any suitable arrangement. The pipe 6, which below the carriage is provided with a manometer 7 and a pressure regulator 8, runs underneath the carriage and up one end thereof on the outside of the same and is there provided with a cock 9. From the cock 9, the pipe continues on the roof of the carriage to an apparatus 10, which automatically mixes the gas with air in such proportions that a completely combustible gas and air mixture is produced.

From the apparatus 10 a gas and air mixture conduit 11 extends along the roof of the carriage. At the points, where the incandescent light lamps 12, which are intended for lighting the carriage, are arranged, branch conduits 13 are jointed to the conduit 11. Each branch conduit 13 is provided with a bend 14, a loop or the like in order to be sufficiently yielding so that the connection with the corresponding lamp may not be injured by possible expansion of the gas and air mixture in the conduit. The conduit 11, 13 for the gas and air mixture is perfectly closed from the mixing apparatus to the outflow openings or mouths of the burners 15, no additional air of combustion being supplied to said conduit, see Fig. 4.

16 is the shutting off valve, being operated by the arm 17 and provided with a by-pass, (not shown on the drawing) in such a way that a small amount of gas and air mixture is admitted to the burner 15 through the valve 16, when the main supply to the burner is closed. Thus no additional conduit for the pilot flame is necessary, but said pilot flame is established in the main burner itself by changing the position of the arm 17 from "open" to "closed."

18 is an adjusting pin, leaving a narrow space between the pin and the wall of the conduit between the valve 16 and the burner 15, preventing a flame possibly flowing back from the burner to be transmitted to the conduit 13.

Arranging the mixing apparatus 10 on the roof of the carriage insures the purest possible air being supplied to the apparatus and such air is passed through filters of suitable material such as cotton cloth, inclosed in casings $16^x$. The apparatus 10 may however be located on or below the roof 17 of the platform.

By arranging the necessary gas conduits and gas and air conduits on the outside of the carriages it is not necessary to perforate the walls of the carriage for the passage of the conduits, and the cock 9 may be located on the outside so that gas which may possibly leak does not pass into the carriage.

I claim:

1. In an incandescent gas lighting system for railway carriages, the combination of a receiver for compressed gas, rich in carbon, carried by the carriage, an apparatus connected with said receiver for automatically mixing gas and air in correct proportions to produce a completely combustible mixture, an invert incandescent lighting burner, which is unprovided with air supply openings and a conduit closed against the atmosphere throughout its length from said mixing apparatus to the burner mouth of said burner.

2. In an incandescent gas lighting system for railway carriages, the combination of a receiver for compressed gas, rich in carbon, carried by the carriage, connected with an automatic apparatus to produce a completely combustible mixture of gas and air, supplied with gas from said receiver, and with air through a filter, an invert incandescent lighting burner which is unprovided with air supply openings and a conduit closed against the atmosphere throughout its length from said mixing apparatus to the burner mouth of said burner.

3. In an incandescent gas lighting system for railway carriages the combination of a receiver for compressed gas, rich in carbon, mounted transversely below the carriage in a support, trunnions upon which said support is movable, an apparatus connected with said receiver for automatically mixing gas and air in correct proportions to produce a completely combustible mixture, an invert incandescent light burner which is unprovided with air supply openings, and a conduit closed against the atmosphere throughout its length, connecting said apparatus to the mouth of said burner.

4. In an incandescent gas lighting system for railway carriages the combination of a receiver for compressed gas, rich in carbon, mounted on the carriage, an apparatus placed on the roof of the carriage for automatically mixing gas and air in correct proportions to produce a completely combustible mixture, a conduit, closed against the atmosphere, connecting said receiver with said apparatus, branches on the roof of the carriage, extending from said conduit an invert incandescent burner which is unprovided with air supply openings for each branch, said branches being closed against the atmosphere throughout their lengths to the mouth of the burners of said incandescent lamps, and means for making said branches yielding.

In testimony whereof I have affixed my signature in presence of two witnesses.

GUSTAF DALÉN.

Witnesses:
GRETA PRICU,
S. SJÖGREN.

Copies of this patent may be obtained for five cents each, by addressing the "Commissioner of Patents, Washington, D. C."